United States Patent
Sakata

(10) Patent No.: US 8,372,308 B2
(45) Date of Patent: Feb. 12, 2013

(54) PRODUCTION METHOD OF BLUE LIGHT-EMITTING PHOSPHOR

(75) Inventor: Shin-ichi Sakata, Yamaguchi (JP)

(73) Assignee: Ube Industries, Ltd. (JP)

( * ) Notice: Subject to any disclaimer, the term of this patent is extended or adjusted under 35 U.S.C. 154(b) by 460 days.

(21) Appl. No.: 12/278,281

(22) PCT Filed: Feb. 1, 2007

(86) PCT No.: PCT/JP2007/052154
§ 371 (c)(1),
(2), (4) Date: Aug. 5, 2008

(87) PCT Pub. No.: WO2007/091615
PCT Pub. Date: Aug. 16, 2007

(65) Prior Publication Data
US 2009/0035203 A1   Feb. 5, 2009

(30) Foreign Application Priority Data

Feb. 9, 2006   (JP) .................. 2006-031892

(51) Int. Cl.
C09K 11/70  (2006.01)
C09K 11/08  (2006.01)
C09K 11/59  (2006.01)
H01J 61/42  (2006.01)
H01J 61/44  (2006.01)

(52) U.S. Cl. .......... 252/301.4 P; 252/301.4 R; 423/623; 257/79

(58) Field of Classification Search ............... 252/301.4, 252/301.4 P, 301.4 R; 257/79; 423/623; C09K 11/08
See application file for complete search history.

(56) References Cited

U.S. PATENT DOCUMENTS

| 6,884,367 B2 | 4/2005 | Ono et al. |
| 6,899,825 B2 | 5/2005 | Matsuda et al. |
| 7,391,060 B2 * | 6/2008 | Oshio ............................ 257/98 |
| 2003/0111643 A1 | 6/2003 | Ono et al. |

FOREIGN PATENT DOCUMENTS

| JP | 2003-183644 A | 7/2003 |
| JP | 2004-131677 A | 4/2004 |
| JP | 2005-336450 A | 12/2005 |

OTHER PUBLICATIONS

Yoshimatsu (Asia Display/IDW '01, Proceedings of The 21.sup.st International Display Research Conference in conjunction with The 8.sup.th International Display Workshops, pp. 1115-1118).*
Machine translation Oshio(JP2005-336450).*

* cited by examiner

*Primary Examiner* — Jun Li
(74) *Attorney, Agent, or Firm* — DLA Piper LLP (US)

(57) ABSTRACT

A method ensuring that a $CaMgSi_2O_6:Eu^{2+}$ blue light-emitting phosphor having high emission intensity can be produced in an industrially advantageous manner is provided. The production method includes a step of mixing a calcium source powder, a europium source powder, a magnesium source powder and a silicon source powder composed of silicon diimide powder or the like in a ratio producing a $CaMgSi_2O_6:Eu^{2+}$ blue light-emitting phosphor, and a step of subjecting the powder mixture to heating at a temperature of 400 to 1,000° C. in an oxygen-containing gas atmosphere and then firing at a temperature of 800 to 1,500° C. in a reducing gas atmosphere.

3 Claims, No Drawings

PRODUCTION METHOD OF BLUE LIGHT-EMITTING PHOSPHOR

TECHNICAL FIELD

The present invention relates to a production method of a blue light-emitting phosphor having a diopside crystal structure containing europium as an activator.

BACKGROUND ART

As a blue light-emitting phosphor which exhibits blue light emission when excited by an ultraviolet ray pr a vacuum ultraviolet ray, $CaMgSi_2O_6:Eu^{2+}$ (hereinafter sometimes referred to as "$CMS:Eu^{2+}$") obtained by substituting europium for a part of calcium of diopside ($CaMgSi_2O_6$) is known. The $CMS:Eu^{2+}$ blue light-emitting phosphor has a characteristic feature that the crystal structure is stable and emission efficiency decreases less with aging as compared with $BaMgAl_{10}O_{17}:Eu^{2+}$ (hereinafter sometimes referred to as "BAM: $Eu^{2+}$") which is widely utilized as a blue light-emitting material of PDP (plasma display panel) or a rare gas lamp. However, as known, the emission intensity of the CMS:$Eu^{2+}$ blue light-emitting phosphor is lower than that of the BAM:$Eu^{2+}$ blue light-emitting phosphor. Accordingly, there has been a demand for development a $CMS:Eu^{2+}$ blue light-emitting phosphor having high emission intensity.

A $CMS:Eu^{2+}$ blue light-emitting phosphor is generally produced by mixing a calcium source powder, a europium source powder, a magnesium source powder and a silicon source powder in a predetermined ratio to produce a blue light-emitting phosphor having a diopside crystal structure, and firing the mixture of powders in a reducing atmosphere. For the purpose of increasing the emission intensity of the $CMS:Eu^{2+}$ blue light-emitting phosphor, studies have been conventionally made to optimize the raw material powders for the production.

Regarding the method for producing a $CMS:Eu^{2+}$ blue light-emitting phosphor having high emission intensity, Japanese Unexamined Patent Publication (Kokai) No. 2003-183644 discloses use of a silicon oxide powder having a BET specific surface area of 10 m$^2$/g or more as the silicon source powder.

An object of the present invention is to provide a method in that a $CMS:Eu^{2+}$ blue light-emitting phosphor having high emission intensity as: compared with conventional CMS:$Eu^{2+}$ blue light-emitting phosphors can be produced in an industrially advantageous manner.

DISCLOSURE OF THE INVENTION

The present inventors have found that a $CMS:Eu^{2+}$ blue, light-emitting phosphor haying high emission intensity can be produced by a method where an Si—N—H-based powder using, as the main component, silicon diimide produced by reacting a silicon halide such as silicon tetrachloride, silicon tetrabromide or silicon tetraiodide with ammonia in a vapor or liquid phase is used as the silicon source powder, a, calcium source powder, a europium source powder, a magnesium source powder and the silicon, source powder are mixed in a ratio producing a blue light-emitting phosphor having a diopside crystal structure: represented by a basic compositional formula of $CaMgSi_2O_6:Eu^{2+}$ to prepare a powder mixture, and the powder mixture is heated at a temperature, of 400 to 1,000° C. in an oxygen-containing gas atmosphere and then fired at a temperature of 800 to 1,500° C. in a reducing gas atmosphere. The $CMS:Eu^{2+}$ blue light-emitting phosphor obtained by this method is considered to produce high emission intensity because the silicon source powder is uniformly diffused in the powder mixture while, undergoing oxidative decomposition during the firing of the powder mixture in an oxygen-containing gas atmosphere and the uniformity in the composition of the obtained $CMS:Eu^{2+}$ blue light-emitting phosphor is increased by the subsequent, firing in a reducing gas atmosphere. Furthermore, the imide group in the silicon diimide powder remains in the raw materials of $CMS:Eu^{2+}$ to produce divalent europium. In the case where the reaction of raw material powders proceeds in a state of a very fine oxidized component of silicon diimide and the remaining imide group being allowed to be present, divalent europium can be more effectively obtained than in the normal reduction method by a reducing gas. In, other words, as compared with the case using only a reducing gas, the method of the present invention enables the reduction of europium to occur even in the inside of the crystal. Because of this, $CMS:Eu^{2+}$ of the present invention results in high emission intensity.

Accordingly, the present invention resides in a production method of a blue light-emitting phosphor represented by a basic compositional formula of $CaMgSi_2O_6:Eu^{2+}$, comprising a step of mixing a calcium source powder, a europium source powder, a magnesium source powder and a silicon source powder mainly composed of a silicon diimide powder in a ratio producing a blue light-emitting phosphor having a diopside crystal structure represented by a basic compositional formula of $CaMgSi_2O_6:Eu^{2+}$ to prepare a powder mixture, and a step of subjecting the powder mixture to heating at a temperature of 400 to 1,000° C. in an oxygen-containing gas atmosphere and then to firing at a temperature of 800 to 1,500° C. in a reducing gas atmosphere.

The preferred embodiments of the production method of the present invention are as follows.

(1) The powder mixture is in a ratio allowing calcium (Ca), europium (Eu), magnesium (Mg) and silicon (Si) to be present at a molar ratio (Ca:Eu:Mg:Si) of 0.90 to 0.995:0.005 to 0.10:1:1.90 to 2.10, and the molar ratio [Eu/(Ca+Eu)] of europium to the total molar number of calcium and europium is from 0.005 to 0.10.

(2) The average particle diameter of the calcium source powder is from 0.1 to 5.0 μm as measured by a laser scattering diffraction method, the average particle diameter of the europium source powder is from 0.1 to 5.0μm as measured by a laser scattering diffraction method, the average particle diameter of the magnesium source, powder is from 0.01 to; 3.0 μm as converted from the BET specific surface area, and the average particle diameter of the silicon source powder is from 0.001 to 1.0 μm as measured from the electron microscopic image.

By utilizing the production method of the present invention, a $CMS:Eu^{2+}$ blue light-emitting phosphor having high emission, intensity can be produced in an industrially advantageous manner.

BEST MODE FOR CARRYING OUT THE INVENTION

The silicon source powder for use in the $CMS:Eu^{2+}$ blue light-emitting phosphor of the present invention is a silicon diimide powder, and this powder can be produced by reacting a silicon halide such as silicon tetrachloride, silicon tetrabromide or silicon tetraiodide with ammonia in a vapor or liquid phase. The silicon diimide powder produced in this way contains, in addition to the substance represented by [Si(NH)$_2$], Si—N—H-based substances of other modes, for example, a group of substances represented by the compositional formulae $Si_3(NH)_5(NH_2)_2$ and $Si_3N_2(NH)_3$, but the powder may be sufficient if it is an Si—N—H-based powder containing silicon diimide as the main component. The term "containing silicon diimide as the main component" means to contain silicon diimide in an amount of at least 60wt % or more, preferably 75 wt % or more, more preferably 85 wt % or more., still more preferably 95 wt % or more.

the above-described powder may; be used alone or may be used in combination with other silica sources. The average particle diameter of the silicon source powder is preferably from 0.001 to 1.0 μm as measured on an electron microscopic image of the silicon source powder. If the average particle diameter is less than 0.001 μm, oxidation of silicon diimide powder and the like readily proceeds and insufficient remaining of the imide group results; however if it exceeds 1.0 μm, a uniform reaction can hardly proceed. The average particle diameter as used herein indicates an average value of long diameters of particles measured on ah electron microscopic image.

Examples of the calcium source powder include, calcium carbonate powder and calcium oxide powder. The purity of the calcium source powder is preferably 99 mass % or more, more preferably 99.9 mass % or more. The average particle diameter of the calcium source powder is preferably from 0.1 to 5.0 μm as measured by a laser scattering diffraction method. A calcium source powder having an average particle diameter less than 0.1 μm is hardly available in industry and is expensive. If a calcium source powder having an average particle diameter exceeding 5.0 μm is used, the reactivity decreases.

Examples of the europium source powder include europium fluoride powder, europium oxide powder and europium chloride powder. The purity of the europium source powder is preferably 99 mass % or more, more preferably 99.5 mass % or more. The average particle diameter of the europium source powder is preferably from 0.1 to 5.0 μm as measured by a laser scattering diffraction method. A europium source powder having an average particle diameter less than 0.1 μm is hardly available in industry and is expensive. If a europium source powder having an average particle diameter exceeding 5.0 μm is used, the reactivity decreases.

Examples of the magnesium source powder include magnesium carbonate powder and magnesium oxide powder. The magnesium source powder is preferably magnesium oxide powder obtained by a method of contacting metallic magnesium vapor with oxygen (vapor phase oxidation reaction method). The purity of the magnesium source powder is preferably 99 mass % or more, more preferably 99.9 mass % or more. The average particle diameter of the magnesium source powder is preferably from 0.01 to 3.0 μm as converted from the BET specific surface area. A magnesium source powder having an average particle diameter less than 0.01 μm has high moisture absorptivity and is difficult to handle. If a magnesium source powder having an average particle diameter exceeding 3.0 μm is used, the reactivity decreases.

In the production method of a CMS:$Eu^{2+}$ blue-emitting phosphor of the present invention, a calcium source powder, a europium source powder, a magnesium source powder and a silicon source powder are mixed in a ratio producing a CMS:$Eu^{2+}$ blue light-emitting phosphor, preferably in a -ratio fallowing calcium (Ca), europium (Eu), magnesium (Mg) arid silicon (Si) to be present at a molar ratio (Ca:Eu:Mg:Si) of 0.90 to 0.995:0.005 to 0.10:1:1.90 to 2.10, and enabling a molar ratio [Eu/(Ca+Eu)] of europium to the total molar number of calcium and europium to fall in a range of 0.005 to 0.10, preferably from 0.015 to 0.030, more preferably from 0.015 to 0.25, to prepare a powder mixture.

In mixing the raw material powders, a known mixing machine, such as ball mill can toe used. The mixing of raw material powders is preferably performed in an organic solvent such as methanol, ethanol and acetone.

The powder mixture obtained in the step above is heated at a temperature of 400 to 1,000° C., preferably from 700 to 900° C., usually for 1 to 10 hours in an oxygen-containing gas atmosphere to cause partial oxidation decomposition of the silicon diimide powder of the silicon source powder and then fired at a temperature of 800 to 1,500° C., preferably from 900 to 1,300° C., usually for 1 to 100 hours in a; reducing gas atmosphere, whereby a CMS:$Eu^{2+}$ blue light-emitting phosphor is produced.

The oxygen-containing gas used at the heating of the powder mixture preferably contains oxygen in a range of 1to 30 vol %. Examples of the oxygen-containing gas include air, and a mixed gas with an inert gas (e.g.; argon gas, nitrogen gas) an oxygen gas. Examples of the reducing gas used at the firing include an inert gas, containing a hydrogen gas in a range of 1 to 10 vol %.

As described above, the CMS:$Eu^{2+}$ blue light-emitting phosphor is known to hardly deteriorate with aging as compared with the BAM:$Eu^{2+}$ blue light-emitting phosphor In addition, the CMS:$Eu^{2+}$ blue light-emit ting phosphor obtained by the production method of the present invention exhibits higher emission intensity than the conventional CMS:$Eu^{2+}$ blue light-emitting phosphor obtained using a silicon dioxide powder as the silicon source powder. Accordingly, the CMS:$Eu^{2+}$ blue light-emitting phosphor obtained by the production method of the present invention is very useful as a blue fluorescent material of PDP or a rare gas lamp.

EXAMPLES

Example 1

A calcium carbonate powder (purity: 99.99 mass %, average particle diameter: 3.87 μm as measured by a laser diffraction scattering method), a europium fluoride powder (purity: 99.9 mass %, average particle diameter: 2.71 μm as measured by a laser diffraction scattering method), a magnesium oxide powder (produced by a vapor phase oxidation reaction method, purity: 99.99 mass %, average particle diameter: 0.05 μm as converted from the BET specific surface area) and a powder mainly comprising silicon diimide obtained by reacting silicon tetrachloride with ammonia (silicon diimide content: 80mass %, purity: 99.9 mass % or more based on metal impurities except for Si—N—H, average particle diameter: 0.004 μm as measured from the electron microscopic image) were weighed to contain calcium, europium, magnesium and silicon at a molar ratio of 0.98:0.0.2:1:2.00 and wet mixed in an ethanol solvent for 24 hours by using a ball mill. The obtained powder mixture was charged, into an alumina crucible and after placing the crucible in a heating furnace, heated at a temperature of 800° C. for 3hours in air atmosphere. The X-ray diffraction pattern of the powder mixture after heating was measured and it was confirmed that merwinite ($Ca_3MgSi_2O_8$) was produced. Subsequently, while adjusting the inside of the furnace to a reducing, atmosphere by introducing a 2 vol % hydrogen-98 vol % argon gas into the heating furnace, the powder mixture was fired at a temperature, of 1,150° C. for 3hours. After allowing the heating furnace temperature to drop to room, temperature, the heating furnace was opened to change the atmosphere inside the furnace into air atmosphere and a heat treatment was performed at a temperature of 600° C. for 1 hour.

After allowing the heating furnace temperature to drop to room temperature, the fired powder was taken out from the heating furnace. The X-ray diffraction pattern of this fired powder was measured, as a result, the obtained X-ray diffraction pattern agreed with the X-ray diffraction pattern of diopside (see, *The Powder Diffraction File (PDF)*, 78-1390, International Center for Diffraction Data (ICDD)).

Comparative Example 1

A mixed powder was produced in the same manner as in Example 1 except for using a silicon dioxide powder (BET specific surface area.: 190 m²/g) in place of silicon diimide. The obtained powder mixture was charged into an alumina crucible and while adjusting the inside of the furnace to a reducing atmosphere by introducing a 2 vol % hydrogen-98 vol % argon gas into the heating furnace, the powder mixture was fired at a temperature of 1,150° C. for 3hours. After allowing the heating furnace temperature to drop to room temperature, the heating furnace was opened to change the atmosphere inside the furnace into air atmosphere and a heat, treatment was performed at a temperature of 600° C. for 1 hour. After allowing the heating furnace temperature to drop to room temperature, the fired powder was taken out from the heating furnace, the X-ray diffraction pattern of this fired powder was measured, as a result, the obtained X-ray diffraction pattern agreed with the X-ray diffraction pattern of diopside.

[Evaluation]

The fired powders obtained in Example 1 and Comparative Example 1 each was measured for the light emission spectrum by a spectrophotofluorometer at an excitation wavelength of 1.46 nm, and: the maximum emission intensity (maximum peak of the light emission spectrum) of the fired powder obtained in Example 1 was compared with the maximum emission intensity of the fired powder obtained in Comparative Example 1, as a result, it was confirmed that the maximum emission intensity of the fired powder obtained in Example: 1 shows as a high value as 1.15 times the maximum emission intensity of the fired powder obtained in Comparative Example 1.

Example 2

A CMS:Eu²⁺ phosphor was produced in the same manner as in Example 1, except for weighing the powders to contain calcium, europium, magnesium and silicon at a molar ratio of 0.91:0.09:1:2.00. Furthermore, the fluorescence spectrum was measured in the same manner as in Example 1. It was confirmed that the maximum emission intensity of the fired powder obtained in Example 2 shows as a high value as 1.03 times the maximum emission intensity of the fired powder obtained in Comparative Example 1.

Comparative Example 2

A mixed powder was produced in the same manner as in Example 2 except for using a silicon dioxide powder (BET specific surface area: 19.0 m²/g) in place of silicon diimide, and the mixed powder was fired in the same manner as in Comparative Example 1. Furthermore, the fluorescence spectrum of the obtained powder was measured in the same manner as in Example 1. The maximum emission intensity of the fired powder obtained in Comparative Example 2 was 0.84 times the maximum emission intensity of the fired, powder obtained: in Comparative Example 1.

Industrial Applicability

The CMS:Eu²⁺ blue light-emitting phosphor obtained by the production method of the present invention exhibits high emission intensity as compared with the conventional CMS:Eu²⁺ blue light-emitting phosphor obtained using a silicon dioxide powder as the silicon source powder. Accordingly, the CMS:Eu²⁺ blue light-emitting phosphor obtained by the production, method of the present invention is very useful as a blue fluorescent material of PDP or a rare gas lamp.

The invention claimed is:

1. A method of producing a blue light-emitting phosphor represented by a basic compositional formula of $CaMgSi_2O_6$:$Eu^{2+}$, comprising preparing a powder mixture by mixing a calcium source powder having a purity of 99 mass % or more, a europium source powder having a purity of 99 mass % or more, a magnesium source powder having a purity of 99 mass % or more and a silicon source consisting essentially of silicon diimide powder in a ratio producing a blue light-emitting phosphor having a diopside crystal structure represented by a basic compositional formula of $CaMgSi_2O_6$:$Eu^{2+}$ to prepare a powder mixture, said powder mixture consisting essentially of said calcium source powder, said europium source powder, said magnesium source powder and said silicon source consisting essentially of silicon diimide powder, and subjecting said powder mixture to heating at a temperature of 400 to 1,000° C. in an oxygen-containing gas atmosphere to cause partial oxidative decomposition of the silicon source consisting essentially of silicon diimide powder wherein remaining imide group from silicon diimide presents in the powder mixture, and then firing at a temperature of 800 to 1,500° C. in a reducing gas atmosphere.

2. The method as claimed in claim 1, wherein said powder mixture is in a ratio allowing calcium (Ca), europium (Eu), magnesium (Mg) and silicon (Si) to be present at a molar ratio (Ca:Eu:Mg:Si) of 0.90 to 0.995:0.005 to 0.10:1:1.90 to 2.10 and the molar ratio [Eu/(Ca+Eu)] of europium to the total molar number of calcium and europium is from 0.005 to 0.10.

3. The method as claimed in claim 1 or 2, wherein the average particle diameter of said calcium source powder is from 0.1 to 5.0 μm as measured by a laser scattering diffraction method, the average particle diameter of said europium source powder is from 0.1 to 5.0 μm as measured by a laser scattering diffraction method, the average particle diameter of said magnesium source powder is from 0.01 to 3.0 μm as converted from the BET specific surface area, and the average particle diameter of said silicon source consisting essentially of silicon diimide powder is from 0.001 to 1.0 μm as measured from the electron microscopic image.

* * * * *

UNITED STATES PATENT AND TRADEMARK OFFICE
CERTIFICATE OF CORRECTION

PATENT NO. : 8,372,308 B2
APPLICATION NO. : 12/278281
DATED : February 12, 2013
INVENTOR(S) : Shin-ichi Sakata Page 1 of 1

It is certified that error appears in the above-identified patent and that said Letters Patent is hereby corrected as shown below:

In the Specifications:

In Column 3

At line 8, please change "the" to --The--.

In Column 5

At line 33, please change "1.46 nm" to --146 nm--.

Signed and Sealed this
Third Day of September, 2013

Teresa Stanek Rea
*Acting Director of the United States Patent and Trademark Office*